United States Patent [19]
O'Brien, Jr.

[11] Patent Number: 5,235,506
[45] Date of Patent: Aug. 10, 1993

[54] PROCESS WHICH AIDS TO THE LAYING OUT OF LOCATIONS OF A LIMITED NUMBER OF 100, PERSONNEL AND EQUIPMENTS IN FUNCTIONAL ORGANIZATION

[75] Inventor: Francis J. O'Brien, Jr., Newport, R.I.

[73] Assignee: The United States of America as represented by the Secretary of the Navy, Washington, D.C.

[21] Appl. No.: 754,789

[22] Filed: Aug. 30, 1991

[51] Int. Cl.$^5$ .............................................. G06F 15/20
[52] U.S. Cl. ..................................... 364/400; 364/401
[58] Field of Search ...................... 364/400, 401, 402

[56] References Cited

PUBLICATIONS

Siegel, A. L., J. J. Wolf, and J. Pilitsis (1982), "A New Method for the Scientific Layout of Workspaces", Applied Ergonomics, 13(2), 87–90.
Tullis, T. S., B. Sperling, and A. L. Steinberg (1986), The Use of Multidimensional Scaling for Facilties Layout: "An Application to the Design of the Space Station", Proceedings of the Human Factors Society—30th Annual Meeting (38–42).
O'Brien, F., "A Crowding Index for Finite Populations", Perceptual and Motor Skills, 1990, 70, pp. 3–11.

Primary Examiner—Roy N. Envall, Jr.
Assistant Examiner—Frantzy Poinvil
Attorney, Agent, or Firm—Michael J. McGowan; Prithvi C. Lall; Michael F. Oglo

[57] ABSTRACT

A method which is of aid in the laying out of locations of personnel and equipments in functional organizations where the personnel and equipments do not exceed numeral 100 and can be represented as density units in rectangular or square lattices. The relationship among objects in a particular space can be accurately determined to minimize crowding. The method has utility in laying out military attack center items of equipments being operating upon by center personnel for purposes of enhancing man-machine interfaces throughout the attack center. The method of the invention may be used alone or in combination with other techniques such as multidimensional scaling (MDS) to improve the accuracy of such other techniques.

5 Claims, 3 Drawing Sheets

PROCESS WHICH AIDS TO THE LAYING OUT OF LOCATIONS OF A LIMITED NUMBER OF 100, PERSONNEL AND EQUIPMENTS IN FUNCTIONAL ORGANIZATION

STATEMENT OF GOVERNMENT INTEREST

The invention described herein may be manufactured and used by or for the Government of the United States of America for governmental purposes without the payment of any royalties thereon or therefor.

CROSS-REFERENCE TO RELATED APPLICATIONS

This patent application is co-pending with two related patent applications, respectively, Ser. No. 07/754,779, filed Aug. 30, 1991 entitled "Process Which Aids in the Laying Out of Locations of Personnel and Equipments in Functional Organizations, Including Features of Special Applicability Where a Capability for Handling an Unlimited Number of Personnel/Equipment Data Items is Desired" and Ser. No. 07/756,264, filed Aug. 30, 1991 "Process Which Aids in the Laying Out of Locations of Personnel/Equipments in Functional Organizations, Including a Feature of Use of Abbreviated Calculation Routines", both by the same inventor and filed on the same date as this patent application.

BACKGROUND OF THE INVENTION (1) Field of the Invention

This invention provides a more accurate and flexible method for producing spatial layouts of objects (including equipments, personnel, or combinations of equipments and personnel) under circumstances in which it is important to consider discrete spatial density in any rectangular or square lattice containing 100 or less density points. Thus, the relationship among objects in a particular space can be accurately determined to minimize crowding.

(2) Description of the Prior Art

The conventional formula to measure or model two-dimensional discrete spatial density; i.e., population density or physical crowding is defined as the average number of objects (n) per unit area of space (A):

$$D = n/A \tag{1}$$

This definition has severe shortcomings since actual spatial orientation within a specified area is disregarded. As an example of this shortcoming, refer to FIG. 1 which displays three different configurations of objects or density points. In each case, the "perceived density" of the four points is obviously different. Since the number of points and area are identical in each depiction, there is a constant value of 0.25 for Population density. FIG. 2 depicts geometrically the population demographer's model of population density shown for the distributions in FIG. 1. FIG. 2 shows that each point occupies four space units (such as feet); hence, population density or physical crowdedness ($D = n/A$) equals one object per four square feet. FIG. 2 represents the model for each depiction of FIG. 1. However, large differences in perceived physical crowding clearly exist among the three configurations shown in FIG. 1.

A formula was then derived by the inventor to capture the differences shown in FIG. 1 more accurately by taking the actual spatial orientation of objects into account. See O'Brien, F., "A Crowding Index for Finite Populations", *Perceptual and Motor Skills*, February 1990, 70, pp. 3–11 which is incorporated into this disclosure in its entirety by reference.

This formula, referred to as the Population Density Index (PDI), is as follows:

$$PDI = \frac{1}{\bar{d}}\sqrt{\frac{n}{A}} \tag{2}$$

where
n = number of objects
A = the geometric area, and
$\bar{d}$ = average Euclidean distance among all possible pairs of n objects.

Basically, the above proposed formula is a generalization of the bivariate Euclidean distance formula. The derivation of the proposed formula is patterned on the well known square-root law used in the physical sciences.

Assume two objects are plotted on an X, Y Cartesian coordinate system with a fixed origin O. The mathematical distance between the two objects is measurable by simple analytic geometry using the Pythagorean distance formula:

$$d_{12} = [(X_1 - X_2)^2 + (Y_1 - Y_2)^2]^{\frac{1}{2}} \tag{3}$$

where $(X_1, Y_1)$; $(X_2, Y_2)$ represent each object's coordinates.

If, now, we conceive of n objects, each given coordinates within the same geometric plane such as a room, it is possible to generalize the above formula to obtain an average Euclidean distance among the n objects. The average Euclidean distance of n points, considered pairwise, is given by:

$$\bar{d} = \frac{2 \sum_{i<j} d_{ij}}{n(n-1)} \tag{4}$$

where $d_{ij}$ is the Euclidean distance between any two objects. Note that for $n = 2$ objects, $\bar{d}; d_{12}$ are equivalent.

The last step in deriving a density index is to scale $\bar{d}$ to adjust for a given number of objects residing within a specific area. A proposed general formula based on the square-root inverse law for distances incorporating size of area and the number of objects is:

$$\Delta = \bar{d}\sqrt{\frac{A}{n}} \tag{5}$$

where
A = the geometric area in which objects reside, and
n = the number of objects within one area.

Dimensional analysis, as well as empirical Monte Carlo simulation investigations, of $\Delta$ shows that the units are:

$$\frac{A}{\sqrt{n}}; \frac{ft^2}{\sqrt{n}}. \tag{6}$$

Essentially, $\Delta$ is the average pairwise Euclidean distance among n objects scaled for a given unit area. As will become evident in the following numerical example, $\Delta$ is inversely related to the average geometric distances among n points. Calculating the reciprocal of $\Delta$, $1/\Delta$ will make the relationship monotonically increasing, that is, the more densely packed the objects, the higher the value of the index. This reciprocal of $\Delta$, or $1/\Delta$, is arbitrarily referred to as the population density index, or PDI. The units for PDI are $\sqrt{n/A}$.

A computational example is provided with the aid of FIG. 3. For four points, there are $4 \times 3/2 = 6$ pairwise distances to calculate. The coordinate points for the 4 units are (1,1), (1,3), (2,4) and (3,2). The area shown is 16 units. Applying $\Delta$, $$\Delta = \frac{2(d_{12} + d_{13} + d_{14} + d_{23} + d_{24} + d_{34})}{4(3)} \sqrt{\frac{A}{n}} = \qquad (7)$$

$$\sqrt{\frac{16}{4}} (2.22) = 4.4$$

Calculating the reciprocal of $\Delta$ and multiplying by 10 to give integer results, PDI=2.3.

The $\Delta$ index appears to be valid even when areas differ by a large amount. To demonstrate this, consider FIGS. 4A and 4B. The average Euclidean distances are identical (1.6) in each situation depicted. The smaller value of $\Delta$ in FIG. 4A (3.7) is in accord with the basic interpretation of $\Delta$, that is, the smaller the value of $\Delta$, the more densely packed are the points relative to the allowed area. The results also correspond to the intuitive notion of density.

The proposed crowding index, $\Delta$ or PDI, should be interpreted as a relative measure much like a standard deviation in statistics. The theoretical mathematical minimum value of $\Delta$ or PDI is always 0, a condition realizable with dimensionless points but not realizable with solid objects such as people.

The maximum value depends on the number of objects and the geometric area. Beyond three or four objects, it becomes difficult and perhaps meaningless to attempt calculating a precise maximum value of $\Delta$ or PDI. For these reasons, hypothetical minimum and maximum bounds of the PDI formula are derived below and presented as an integral component of this disclosure. Three additional properties derived from the square-root law for average distances of $\Delta$ or PDI appear to be critical to the usefulness and interpretability of the index: 1) for constant area, PDI varies directly with the number of objects; 2) for a constant number of objects, PDI varies indirectly with area; and 3) for a constant number of objects and constant area, PDI varies indirectly with distance. Small sample Monte Carlo simulations performed by the inventor have supported these square-root properties for the PDI formula. The values of PDI computed from randomly selected uniform distributions correlated 0.96 with the conventional formula for population density (n/A).

In addition, the PDI formula can be evaluated on three key scientific criteria. First, the model is very simple. It connects population density to three key variables—distance, number of points and area—through an equation that can be readily calculated. Second, the formula is justified by mathematical analysis. The inverse square-root properties of the index stated as conjectures are very reasonable and provide a context for prediction and explanation of observed results. Monte Carlo simulations support each conjecture, thereby providing preliminary justification until large scale simulations can be conducted. Third, the formula has been tested and verified by empirical research. The use of the formula in hypothetical military settings has produced results that were readily interpretable and which correlated with qualitative estimates of crowding made by independent expert observers.

The population density formula attempts to express differences such as those shown in FIG. 1 more accurately than the conventional population density formula. Since the index can vary widely, as indicated in FIG. 1, it was necessary to develop a new model to predict minimum and maximum bounds of the population density index values. It was in this light that the present invention was conceived and has now been reduced to practice.

SUMMARY OF THE INVENTION

The present invention concerns this newly developed model which provides a more accurate interpretation of the population density index values by predicting the minimum and maximum bounds of such population density index values. This model is designed for small sample research in the area of population density analysis. The population density index model includes a measure of interperson distance and is scaled for a geometric area enabling measurement of population density with greater precision and flexibility than the conventional population density model. The population density index model of the invention is designed for small-scale projects involving as few as two and as many as one hundred density points.

A review of the scientific literature and discussion with experts in the field of micro-population demography, resulted in the decision to provide the model for up to only 100 density points. This quantity is likely to be useful in a great majority of the tasks of researchers and other scientists or engineers involving concentrations and activities of small populations of objects, such as control rooms for various functional operations (including attack centers on warships), prisons, school classrooms and other micro-populations. It is to be understood that the term "Populations of objects" includes equipments, personnel, and combinations of equipments and personnel.

The advantage of the improved population density model is that it measures population density for 100 or less points with greater precision and flexibility, thereby enhancing its utility for the prediction of minimum and maximum bounds of the PDI value.

Later herein, in the section entitled "Description of the Preferred Embodiment" the PDI model is applied to a hypothetical military setting. However, it can be used in any application for the measurement of discrete spatial population density for density points of 100 or less. Also, this PDI model need not be limited to people. It can be applied to any representable two dimensional configuration of points as diverse as stars, microscopically observable data such as living micro-organisms, automobile traffic, aerial photographic data and the like. By rational extension, the model can be applied to three dimensional configurations such as multi-floored structures.

Accordingly, the principle objects of the present invention are:

(1) To provide a process which aids in the laying out of the locations of personnel and equipments in a functional organization in a quadrilateral area, and which enables the persons tasked to perform the layouts to predict minimum and maximum bounds of a population density index value.

(2) To provide a process which aids in the laying out of the locations of personnel and equipments in a functional organization in a quadrilateral area, and which provides a high level of precision in the discrimination of adverse crowding effects as between compared layout solutions.

(3) To provide a process which aids in the laying out of locations of personnel and equipments in a functional organization in a quadrelateral area, and which is applicable for a range of personnel/equipment data items between 2 and 100.

(4) To provide a process which aids in the laying out of locations of personnel and equipments in a functional organization in a quadrilateral area, and which is universal in its applicability to subject matters that can be modeled as discrete spatial population density points.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein:

FIG. 7A depicting a minimum density situation, FIG. 7B depicting a maximum density situation, FIG. 7C depicting an actual observed density situation, and FIG. 7D depicting a hypothetical lattice translation of FIG. 7C;

DESCRIPTION OF THE PREFERRED EMBODIMENT

For the remainder of this disclosure, reference will be made particularly to FIGS. 5-8.

The process which aids in laying out of personnel and/or equipment locations within a functional organization in accordance with the present invention includes provision of a novel modeling technique, which is performed in four steps. First, given the sample size of density points and geometric area of interest, the points are plotted in a lattice or uniform, that is, two dimensional grid, distribution, that is, in a checkerboard arrangement with every consecutive horizontal and vertical point being equidistant. Secondly, using this plotted distribution, two theoretical indices are calculated—a lower bound density index and an upper bound density index. Thirdly, the data regarding the personnel and/or equipments which are the subjects of the layout are collected, and the population density index values are calculated. The inventor has proven mathematically that the actual PDI ($PDI_{act}$) is bounded by the minimum and maximum PDIs. Fourthly, the "effective interperson distance" index is calculated based on the "effective interpoint distance" index (or where personnel crowding is the principle consideration the "effective interperson distance" index ), and the research findings are compared to the model indices.

The model enables an evaluation of the different layout solutions explored as part of a given layout task, and enables comparisons with solutions provided in connection with other layout tasks. The lattice or uniform distribution is an effective visual aid for demonstrating how population density changes with dynamic human or equipment positioning being recorded at will.

The lower bound of the population density index can be calculated for any uniform arrangement of points so long as the number of points does not exceed 100. The lower bound is based on a lattice of the integers called a "unit lattice". In general, a unit lattice means a uniform distribution of n points in area A such that n=A. This implies that the interpoint distance of consecutive horizontal and vertical points is always equal to 1. A nonunit lattice will mean that n and A are not equal. In the special cases of n=2 and n=3 objects, "unit lattice" means either a unit line segment (n=2) or, for n=3, a Euclidean equilateral triangle (perimeter=3 units), each constructed in the interior of A. A linear dimension is herein designated in feet.

Figure 1:
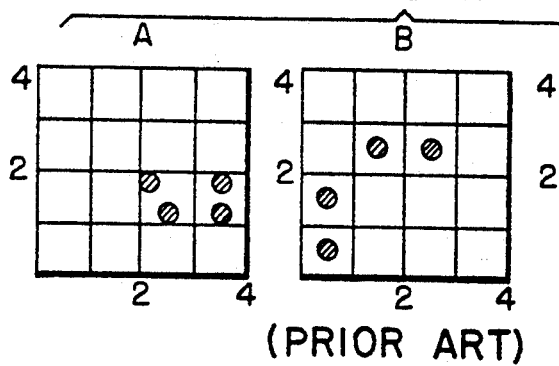
FIGS. 1A, 1B, and 1C are different examples of population density configurations depicting different positioning, respectively, of the same number of density points in a uniform lattice.
Figure 2:
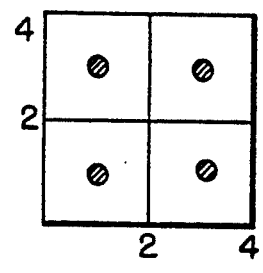
FIG. 2 depicts the population demographer's model of population density for each of FIGS. 1A, 1B, and 1C.
Figure 3:
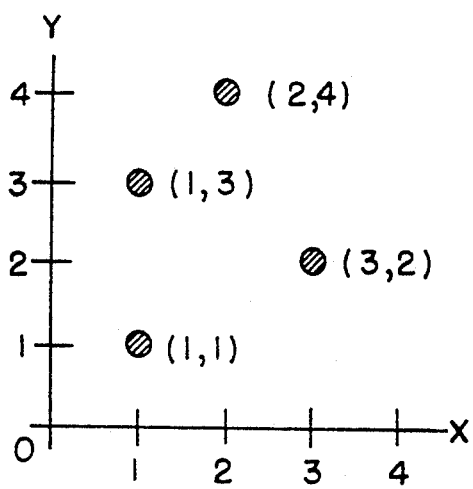
FIG. 3 is a depiction of four density points plotted on an X, Y Cartesian coordinate system with a fixed origin 0.
Figure 5:
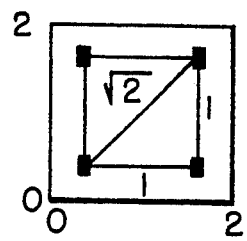
FIG. 5 is an example of a 2×2 "unit" lattice containing four connected density points.
Figure 4A:
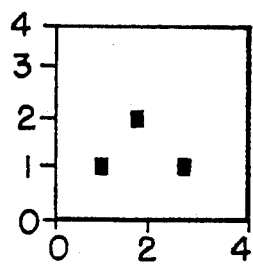
FIGS. 4A and 4B depict three density points, with identical average Euclidean distances between them but positioned, respectively, on different sized areas.
Figure 4B:
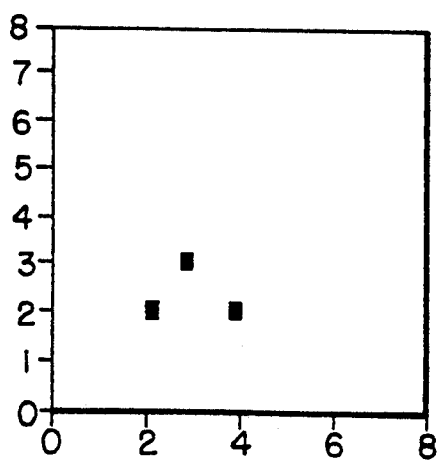

FIG. 5 is an example of a 2×2 unit lattice. In FIG. 5, note that the area is 4 ft² and that the number of points is 4, or n=A. The horizontal and vertical distance between each of the consecutive points is equal to 1. This is derived from a simple relation that provides interpoint distances of lattices. Namely, if δ denotes the interpoint distance, then $$\delta = \sqrt{4 \frac{ft^2}{4}} = 1 \tag{8}$$

where δ is in feet.

The above example illustrates the approach that is used for approximating interpoint distances for any lattice of n points uniformly distributed in area A. The general formula to do this is given by:

$$\delta = \sqrt{\frac{A}{n}}. \tag{9}$$

The next step, calculating the average Euclidean distance of all possible pairs of points in FIG. 5, is given by:

$$\overline{\Delta} = \frac{1+1+1+1+\sqrt{2}+\sqrt{2}}{6} = 1.14 \tag{10}$$

The average Euclidean distance for a unit lattice is called Δ to distinguish it from the general Euclidean distance given by $\bar{d}$ in the general population density index formula:

$$PDI = \frac{1}{\bar{d}}\sqrt{\frac{n}{A}} \quad (11)$$

The population density index value for the unit lattice of FIG. 5 can now be calculated. To do this, first substitute the numerical value of $\bar{\Delta}$ (i.e., 1.14) from the above calculation, into the general population density index formula:

$$PDI = \frac{1}{\bar{d}}\sqrt{\frac{n}{A}}; \quad (12)$$

to wit:

$$PDI = \frac{\sqrt{\frac{4}{4}}}{1.14} \approx 0.88. \quad (13)$$

Table 1 shows computed values of $\bar{\Delta}$ for representative unit lattice distributions for example sizes not exceeding 100 density points.

TABLE 1

EUCLIDEAN DISTANCE VALUES FOR SELECTED UNIT LATTICES (IN FT)

| Lattice (n = Area) | $\bar{\Delta}$ | Lattice (n = Area) | $\bar{\Delta}$ |
|---|---|---|---|
| 2 × 1 | 1.00 | 7 × 4 | 2.97 |
| 2 × 2 | 1.14 | 7 × 5 | 3.19 |
| 3 × 1 | 1.00 | 7 × 6 | 3.43 |
| 3 × 2 | 1.42 | 7 × 7 | 3.68 |
| 3 × 3 | 1.63 | 8 × 2 | 2.97 |
| 4 × 2 | 1.71 | 8 × 3 | 3.09 |
| 4 × 3 | 1.90 | 8 × 8 | 4.20 |
| 4 × 4 | 2.14 | 9 × 2 | 3.29 |
| 5 × 2 | 2.01 | 9 × 3 | 3.41 |
| 5 × 3 | 2.19 | 9 × 9 | 4.72 |
| 5 × 4 | 2.41 | 10 × 2 | 3.62 |
| 5 × 5 | 2.65 | 10 × 3 | 3.72 |
| 6 × 2 | 2.32 | 10 × 4 | 3.88 |
| 6 × 3 | 2.48 | 10 × 5 | 4.07 |
| 6 × 4 | 2.69 | 10 × 6 | 4.27 |
| 6 × 5 | 2.92 | 10 × 7 | 4.50 |
| 6 × 6 | 3.18 | 10 × 8 | 4.74 |
| 7 × 2 | 2.65 | 10 × 9 | 4.98 |
| 7 × 3 | 2.78 | 10 × 10 | 5.24 |

In the first column, values for both sample size (n) and area (A) are given. To use the table, select an appropriate value based on the entry equal to or closest to sample size. It may be necessary to adjust initial unit lattice selections if dimensions of the area studied will not accommodate the distribution of points in the lattice configuration specified by the interpoint distance. This is usually a problem for cases where the area is highly rectangular and the sample size is a square number, e.g., 16 or 25. The model assumes that the n corresponding to the unit lattice is used in calculation of the three indices. For example, if n = 18 and area = 10 ft × 8 ft = 80 ft$^2$, the unit lattice 6×3 ($\bar{\Delta}$=2.48 ft) will provide an adequate model. In general, the value which most closely approximates the shape of the area involved in the study should be selected, that is, the row by column distribution of the lattice points should be commensurate with the shape of the exterior region A in which the lattice points reside.

In the first column of Table 1, as noted above, the dimensions and sample size are given. For example, the fourth entry under "lattice" is "3×2" meaning a 3×2 ft$^2$ unit lattice with 6 points and dimensions 6 square units that has associated with it an average Euclidean distance of 1.42 ft. Each of the three indices in the population density index model is based on the $\bar{\Delta}$ values shown in Table 1.

The reference parameter "lower bound estimate of the index for a nonunit lattice" can now be derived. (Note that this reference parameter is a hypothetical concept). It will be appreciated that this is prior to conducting the density analysis. The task worker will have collected data providing a knowledge of the number of points in the area, but the expected lower bound Euclidean distance will not be known. The known average interpoint distance relationship of equation:

$$\delta = \sqrt{\frac{A}{n}} \quad (14)$$

is used to calculate the average Euclidean distance for any nonunit lattice with the same number of points as the unit lattice distribution. The formula to calculate the average Euclidean distance associated with the minimum density ($\bar{d}_{min}$) is given in the following equation:

$$\bar{d}_{min} = \bar{\Delta}\sqrt{\frac{A}{n}} \quad (15)$$

That is, each coordinate point in the unit lattice is scaled by a constant, equal to $\delta$ in equation:

$$\delta = \sqrt{\frac{A}{n}} \quad (16)$$

to calculate the lower bound of the average Euclidean distance.

Thus, the lower-bound model of the population density index is obtained by replacing $\bar{d}$ in the general population density index formula:

$$PDI = \frac{1}{\bar{d}}\sqrt{\frac{n}{A}} \quad (17)$$

by $\bar{d}_{min}$ in equation:

$$\bar{d}_{min} = \bar{\Delta}\sqrt{\frac{A}{n}}; \quad (18)$$

and simplifying the result is the lower bound (PDI$_{min}$):

$$PDI_{min} = \frac{1}{\bar{\Delta}}\frac{n}{A}. \quad (19)$$

Figure 6:
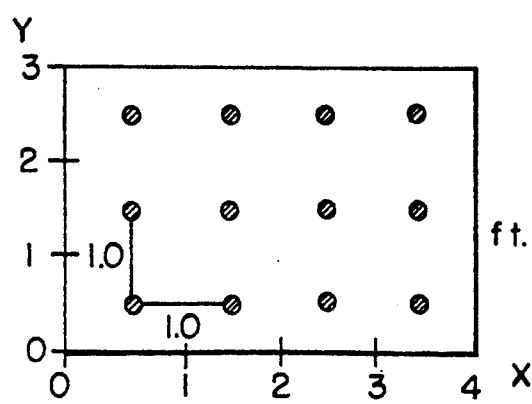
FIG. 6 depicts a 4×3 "unit" lattice containing twelve density points.

To provide an example of calculating the population density index lower-bound (PDI$_{min}$), assume a study is being conducted on 12 people. Also assume the area involved in the study is a square with area of 25 ft$^2$. The appropriate $\bar{\Delta}$ to select from Table 1 is based on n=12. There are two logical choices in the selection of a unit lattice of 12 points: 4×3 and 6×2, or equivalently 3×4 and 6×2. A unit lattice of 4×3 or 3×4 will provide an excellent estimate of the lower-bound value of the index. The only other logical choice for a uniform distribution of 12 points is the unit lattice 6×2 or 2×6; however, with this choice, the 12 points cannot be accommodated into a 5-ft.×5-ft. area with interpoint distance $\delta = 1.4$. FIG. 6 shows the 4×3 unit lattice. As shown in Table 1, $\overline{\Delta}$ for the 4×3 lattice is 1.90. Thus, the lower bound population density index based on equation:

$$PDI_{min} = \frac{1}{\overline{\Delta}} \frac{n}{A} \tag{20}$$

is (1/1.90) (12/25), which is approximately equal to 0.25. The population density index can be no smaller than 0.25 units in a lattice distribution consisting of 12 (4×3 unit lattice) points and area 25 ft² with interpoint distance of about 1.4.

The calculation of the upper bound of the index is based on a further assumption. It is assumed that there is a minimum (non-zero) interpoint distance between any two neighboring points in a uniform distribution corresponding to some practical lower limit of elbow room allowable between persons. The distance value selected will correspond to a lattice distribution that produces the maximum population density index value for the given number of objects and area in a layout task. Selecting the minimum interpoint distance is empirical. To exemplify the derivation, assume that 1 ft is the minimum value. As is widely accepted by persons skilled in the art to which the present invention pertains, this distance might correspond to the nose-to-nose distance of two persons positioned shoulder-to-shoulder. Other values of minimum interpoint distance, appropriate to the circumstances of the functional organization involved in a given task at hand, are to be selected by the task worker. Then the task worker computes an upper bound for the population density index using the derivation that follows.

The assumption that 1 ft is the practical minimum interpoint distance translates into $\delta$ of $\delta = \sqrt{A/n}$ being set to 1. From this, it follows from equation:

$$\overline{d}_{min} = \overline{\Delta} \sqrt{\frac{A}{n}} \tag{21}$$

that the upper bound of the average Euclidean distance ($\overline{d}_{max}$) is:

$$\overline{d}_{max} = \overline{\Delta} \sqrt{\frac{A}{n}} = \Delta \tag{22}$$

Substituting equation:

$$\overline{d}_{max} = \overline{\Delta} \sqrt{\frac{A}{n}} = \Delta \tag{23}$$

into the general population density index formula:

$$PDI = \frac{1}{\overline{d}} \sqrt{\frac{n}{A}} \tag{24}$$

gives the upper bound:

$$PDI_{max} = \frac{1}{\overline{\Delta}} \sqrt{\frac{n}{A}} . \tag{25}$$

Equation $$PDI_{max} = \frac{1}{\overline{\Delta}} \sqrt{\frac{n}{A}} \tag{26}$$

gives the expected reference parameter "upper bound of the population density index in a lattice distribution" (which is a hypothetical concept) assuming a 1-ft distance as the practical minimum value of interpoint elbow room. From the earlier example where n=12 objects and area=25 ft², $PDI_{max}$ is equal to:

$$PDI_{max} = (1/1.90)(12/25)^{\frac{1}{2}} = 0.36. \tag{27}$$

That is, density can be no larger than, 0.36 units when the 12 density points are distributed uniformly with a one foot distance between each horizontal or vertical point.

In general, if the selected interpoint distance $$\delta = \sqrt{\frac{A}{n}} \tag{28}$$

is some arbitrary constant c, then $PDI_{max}$ is:

$$PDI_{max} = \frac{1}{c\overline{\Delta}} \sqrt{\frac{n}{A}} . \tag{29}$$

For example, if 1 in. is the selected value for c, then the maximum population density index value is $$PDI_{max} = 12(1/1.90)(12/25)^{\frac{1}{2}} = 4.38. \tag{30}$$

The final index provided by the model is called the actual effective interpoint distance or $\delta_{eff}$. The effective interpoint distance index translates the clustering of n points observed in an actual study into a lattice distribution for which a hypothetical interpoint distance, or effective interpoint distance can be determined and compared with the theoretical maximum interpoint distance of uniform dispersions in non unit lattices provided by equation:

$$\delta = \sqrt{\frac{A}{n}} . \tag{31}$$

This utility of this comparison resides in the fact that $\delta_{eff}$ varies in accordance with the relation $1 \leq \delta_{eff} \leq \delta$.

The effective uniform interpoint distance index can be derived as follows. A generalized version of equation:

$$\overline{d}_{min} = \overline{\Delta} \sqrt{\frac{A}{n}} \tag{32}$$

provides the average Euclidean distance for any lattice. For $\overline{d}_{min}$ equation:

$$\overline{d}_{min} = \overline{\Delta}\sqrt{\frac{A}{n}} \qquad (33)$$

is calculated directly. For $\overline{d}_{max}$, $\sqrt{A/N}$ is set equal to some hypothetical constant (such as 1). Now, a reference parameter "interpoint distance" such as $\delta = \sqrt{A/n}$ can be conceived theoretically as a variable number for any population density index value in a study with n persons and area A. An interpoint distance such as $\delta$ is strictly determined by the average Euclidean distance and vice versa. Hence, the following equation expresses the hypothetical relationship between the actual Euclidean distance $\overline{d}_{act}$ of an observed population density index value and another reference parameter $\delta_{eff}$:

$$\overline{d}_{act} = \overline{\Delta}\delta_{eff} \qquad (34)$$

Solving for $\delta_{eff}$ gives:

$$\delta_{eff} = \frac{\overline{d}_{act}}{\overline{\Delta}} \qquad (35)$$

Equation:

$$\delta_{eff} = \frac{\overline{d}_{act}}{\overline{\Delta}} \qquad (36)$$

can be stated explicitly in terms of the actual population density index ($PDI_{act}$) of the general population density index formula:

$$PDI = \frac{1}{\overline{d}}\sqrt{\frac{n}{A}} ; \qquad (37)$$

$$\delta_{eff} = \frac{1}{PDI_{act}\overline{\Delta}}\sqrt{\frac{n}{A}} . \qquad (38)$$

Either equation:

$$\delta_{eff} = \frac{\overline{d}_{act}}{\overline{\Delta}} \qquad (39)$$

or $$\delta_{eff} = \frac{1}{PDI_{act}\overline{\Delta}}\sqrt{\frac{n}{A}} \qquad (40)$$

provides the effective interpoint distance in a population density study. To provide an example of effective interpoint distance, assume that in the example described earlier with 12 persons in an area of 25 ft² (refer to FIG. 7), that the actual calculated PDI value ($PDI_{act}$) is 0.30. If a uniform distribution of the 12 points is constructed, what is the hypothetical uniform interpoint distance that preserves the actual average Euclidean distance? $\delta_{eff}$ based on equation:

$$\delta_{eff} = \frac{1}{PDI_{act}\overline{\Delta}}\sqrt{\frac{n}{A}} \qquad (41)$$

is equal to $$(1/0.30)(1/1.90)(12/25)^{\frac{1}{2}} = 1.2 \, ft. \qquad (42)$$

That is, a population density index value of 0.30 means that the 12 persons can be arranged theoretically in a uniform distribution such that the hypothetical interpoint uniform distance is about 1.2 feet. This value can be compared with $$\delta = \sqrt{\frac{25}{12}} \approx 1.4 \qquad (43)$$

which corresponds to the hypothetical inter point maximum uniform dispersion of 12 persons in a 25 ft² area. When this is done, the percent increase in density associated with a population density index of 0.30 is approximately 20 percent (1.2 vs 1.4 ft). It can be shown that the same percentage increase occurs when $PDI_{min}$ (0.25) is compared with $PDI_{act}$ (0.30). In summary, $\delta_{eff}$ gives a useful spatial (visual) mathematical summarization of discrete density translated into terms of uniform interpoint distance language.

Figure 7:
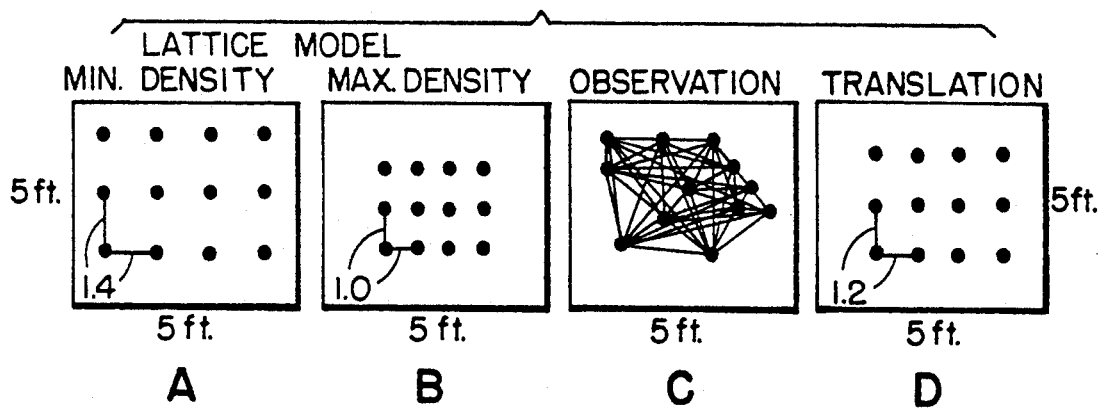
FIGS. 7A, 7B, 7C, and 7D each represent a 5 ft×5 ft area containing twelve points.

To collect all of the information contained in the model, FIG. 7 is presented as a summary for the example employing 12 persons within an area of 25 ft². The assumptions and findings for this example were as follows. First, n was selected as 12 and the area was 25 ft². Secondly, a unit lattice of 4×3 was determined to be appropriate for the calculation of the unit lattice Euclidean distance $\overline{\Delta}$ (1.90, see FIG. 6). In the third step of the model, lower and upper bounds of the population density index were calculated to be 0.25 and 0.36 units, respectively. The lower and upper bounds of the index were shown to be describable in terms of uniform interpoint distances. In the example, those values were 1.4 and 1.0 feet for the lower and upper bounds, respectively. It was then demonstrated how to translate the actual PDI value into an uniform interpoint distance:

$$\delta_{eff} = \frac{1}{PDI_{act}\overline{\Delta}}\sqrt{\frac{n}{A}} \qquad (44)$$

The data points with an actual PDI value of 0.30 were then translated into a uniform distribution of points ("effective distance") which was calculated to be 1.2 ft. Finally it was suggested that one way to interpret the actual density index was by comparison of the effective interpoint distance presented immediately above with the maximum non unit lattice interpoint distance of the following equation: $\delta = \sqrt{A/n}$. This comparison suggested that the actual clustering of the points was 20% more congested than the uniform distribution with minimum density.

PDI has a useful application in that it can accurately explain the relationship of objects in a particular space for density points of 100 or less. Although there may appear to be sufficient room between objects using the subjective "eyeball" test, the PDI model could indicate otherwise since it is based on sound objective mathematical principles. Using PDI, one is able to calculate the most advantageous placement of objects to minimize crowding. Thus, the PDI could be used to eliminate clustering of people or objects, enhance peripheral vision and hearing, and provide sufficient elbow room and freedom of movement when used in conjunction with state-of-the-art facilities layout mathematical methodologies discussed below.

As a specific example, the population density index can be applied in a military setting as a useful relative general measure of personnel congestion in a submarine combat control center. The reader must note that all examples are purely hypothetical. One of the problems inherent in the combat control center is crew density. Many people work in a confined area with a large amount of equipment. In the control room of a hypothetical future generation submarine, for example, it may be common for approximately 20 to 26 individuals to work in an area of 40 feet wide by 11 feet long. Equipment density is an unavoidable constraint due to the limitations in hull size.

However, crew density can change given an equipment rearrangement. In such an environment, the crew members perceptions as well as their actual congestion might contribute to a fatal loss of efficiency. The PDI model is designed to analyze just such a situation. Thus, the PDI formula, which measures the average distance between any two crew members as they are actually distributed scaled by the distance between adjacent crew members assuming that they position themselves uniformly throughout the work space, will provide a quantative analysis as to the best arrangement of the equipment in order to ensure that the equipment is readily accessible, errors are reduced, and performance is enhanced, all of which are compromised in part by overcrowding.

Figure 8:
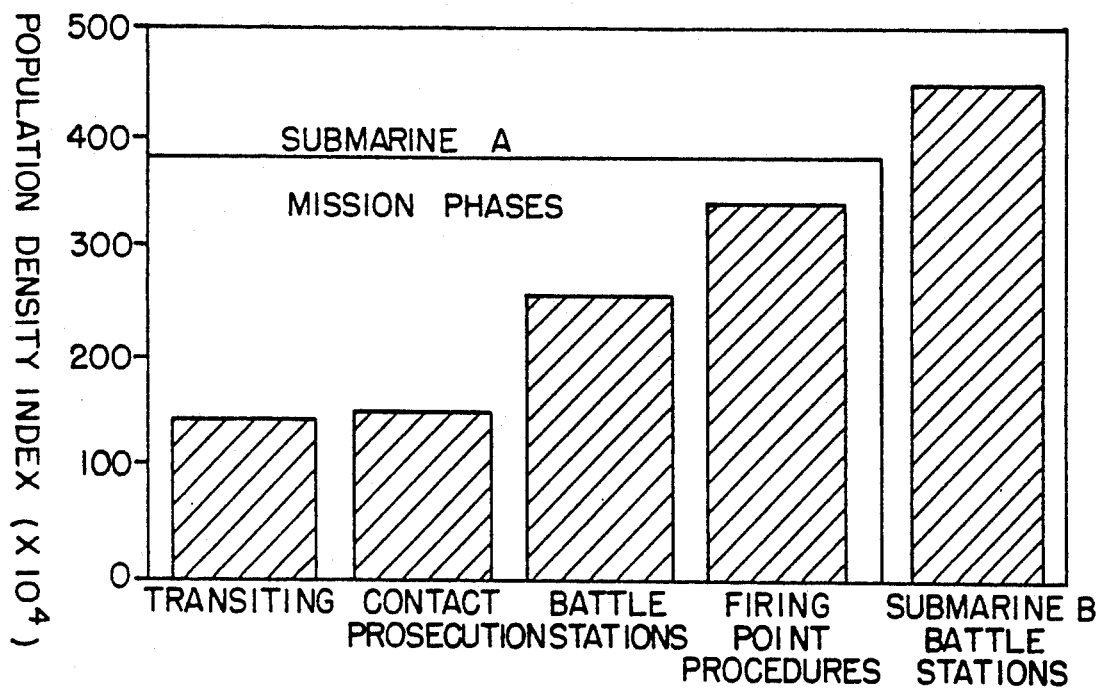
FIG. 8 is a bar graph presenting values of PDI for four major phases of a hypothetical submarine scenario and comparing PDI values for one phase in submarines of two different sizes.

FIG. 8 shows experimentally determined values of PDI for four major phases of a hypothetical submarine scenario. Data for the PDI were obtained by a mock participation in a structured walk through of submarine missions in a full-scale replica of a hypothetical submarine combat control center. The number of personnel increases in each of the first three consecutive phases (transiting, contact prosecution and battle stations) and is logically reflected by increasing values of PDI. However, from the commencement of battle stations through firing point procedures, the number of personnel remains constant. The increase in PDI reflects the increase in congestion of personnel, which was observed to be particularly evident in the area starboard of the periscopes, that is, the attack center, where command and fire control functions occur. This example exemplifies the basic square root properties of the PDI formula applied to actual data derived from a naturalistic setting.

Another example for PDI application is the comparison of crew density during battle stations between very different sized submarine control rooms, as reflected in FIG. 8. If the crew density for a submarine with a 436 sq. ft. combat control center (Submarine A) is compared with that of a 263 sq. ft. submarine combat control center (Submarine B) using the PDI formula, the PDI value (as reflected in FIG. 8) for Submarine A control room during battle stations is predictably lower than the PDI value of the Submarine B control room, thereby implying that personnel are significantly less congested in the larger Submarine A work space.

As a further example, PDI can be calculated for a particular area of the submarine control room, such as the area starboard of the periscopes. The area starboard of the periscopes where a majority of attack center personnel are located during battle stations is approximately 86 percent larger on Submarine A than on Submarine B. In this situation, the PDI value is higher for Submarine B than Submarine A, implying that Submarine A is less crowded than Submarine B in the selected area. However, the average man-to-man distance in Submarine A in this work place is much smaller than the PDI model predicted with $PDI_{min}$ and $PDI_{max}$ calculations given the substantially larger area available for command and fire control functions. Thus, although the total Submarine A work space is larger in size and observed to be much less crowded than Submarine B, it is almost as crowded in the area starboard of the periscopes.

Additional experiments have been conducted utilizing the PDI model to evaluate combat system configurations by "acting out" a simulated submarine mission in complete detail. They were conducted in a full-scale replica of the submarine combat control center and employed subject matter experts as the crew members. The mission scenarios simulated in the experiment were videotaped for analysis, using time lapse photography techniques. The floor of the replicated attack center was tiled with 2-$ft^2$ tiles, thus making it easy to convert crew and equipment positions to an arbitrary Cartesian coordinate system from which to make interpoint distance measurements. Each crew member could be precisely located at any time during the scenario, and the population density index could be calculated readily. The hypothetical submarine scenario was an antisubmarine warfare scenario in which the crew members within the hypothetical advanced attack center prosecuted and attacked an hypothetical enemy submarine. The mission comprised four consecutive stages: transiting, contact prosecution, battle stations and firing-point procedures. During the mission, increasing numbers of crew members entered the attack center to staff their stations and carry out their assigned tasks. Up to 20 men were counted and filmed during this hypothetical scenario.

The population density index measurements were made at the beginning of each of the four mission stages. For each of the stages it was necessary to select the correct unit lattice to make model projections. Trial and error adjustments were required to identify the unit lattice such that n equidistant points could be accommodated into the dimensions of the attack center. The unit lattice that provided the best fit for transiting, for example, turned out to be the 6×2 lattice (n=12). Hence, all model projections were based on n=12. For contact prosecution, the 7×2 unit lattice was used, and a unit lattice of 7×3 was used for battle stations and firing-point procedures.

TABLE 2

Application of Model To Four Stages Of Hypothetical Antisubmarine Warfare Scenario* (Area = 436 $ft^2$)

| Stage | n | $\bar{\Delta}$ | $\delta$ | $PDI_{min}$ | $PDI_{max}$ | $PDI_{act}$ | $\delta_{eff}$ | $\delta/\delta_{eff}$ |
|---|---|---|---|---|---|---|---|---|
| Transit | 11 | 2.32 | 6.0 | 119 | 715 | 140 | 5.1 | 1.18 |
| Contact Pros. | 13 | 2.65 | 5.6 | 121 | 676 | 160 | 4.2 | 1.33 |
| Battle Stats. | 20 | 2.78 | 4.6 | 173 | 789 | 250 | 3.2 | 1.44 |
| Firing-point Procedures | 20 | 2.78 | 4.6 | 173 | 789 | 350 | 2.3 | 2.10 |

*PDI values scaled by $10^4$.
  Assumes 1-ft uniform interpoint distance.

Table 2 presents the results from the time lapse photography analysis in terms of the population density index model. The number and activity of personnel increased as the mission progressed. This is indicated by the PDI values in Table 2 (listed as $PDI_{act}$ in Column 7). Initially, 11 men were in the attack center; at the end of the scenario, 20 men were involved.

Throughout the simulated mission, some personnel were permanently seated, while others moved continuously throughout the center. During battle stations and beyond, the environment was highly fluid as the hypothetical submarine closed range to assume a position to fire a weapon at the hypothetical enemy submarine (without being detected and possibly counterattacked). Fast paced activity and crew stress were clearly evident during the simulation. Note that the actual population density index (Column 7) increased linearly throughout the mission. The last column presents the major finding of the study. The ratio $\delta/\delta_{eff}$ represents the factor by which actual spatial density increases over an hypothetical uniform distribution of minimum spatial density. This ratio also rises steadily as the hypothetical mission progresses. By the firing-point procedures stage, crew congestion increased to over 100% more than the minimum configuration derived for this stage. From first to last stage, the density increased more than two fold. These data can be compared with the conventional spatial density model, as calculated by the equation, $D=n/A$, which indicates less than a doubling of congestion over the lifetime of the hypothetical antisubmarine scenario.

It is interesting to compare the last two stages (battle stations and firing-point procedures) of this hypothetical mission. Each stage employs the same number of persons (20). The conventional density model of the recently stated equation assumes no change in population density from one hypothetical stage to the next. But in the highly fluid firing-point procedures stage, density actually increases by more than 40% over the previous less fluid stage. This implies that in the comparatively large work space of this hypothetical future generation submarine attack center, the mission tasks seem to cause personnel to congest into increasingly smaller clusters of subgroups. The PDI analysis thus resulted in recommendations whereby density (and hence crew stress) could be alleviated thereby increasing the efficiency of the submarine crew.

PDI, as disclosed herein, is a significant facilities layout evaluate measurement metric which can be used in multidimensional scaling (MDS). MDS is a well recognized facilities layout mathematical methodology which is disclosed in detail by Siegel, A. I., J. J. Wolf, and J. Pilitis (1982), "A New Method for the Scientific Layout of Work-spaces", *Applied Ergonomics,* 13 (2), 87-90; and by Tullis, T. S., B. B. Sperling, and A. L. Steinberg (1986), "The Use of Multidimensional Scaling for Facilities Layout: An Application to the Design of the Space Station", *Proceedings of the Human Factors Society—30th Annual Meeting,* 38-42, both publications hereby being incorporated into the instant disclosure in their entirety by reference. MDS can be used to arrange, for example, equipment displays in a control room. Briefly, MDS is a process whereby a matrix of "distances" (either psychological or physical) among a set of objects can be translated into a representation of those objects in space. Typically, the representation is in one-, two-, or three-dimensional space. For purposes of the present invention, only two-dimensional space is being considered. The goal of MDS is to have the distances among the objects in the MDS configuration accurately reflect the distances in the original matrix. For example, MDS is a way of converting a table of mileages between cities into a map showing the relative geographical locations of those cities.

The process starts with some arbitrary or predetermined layout, i.e., a configuration of N points representing the objects to be positioned in a space (for the present case) of two dimensions. Then the points are moved a bit in each successive iteration of the mathematical algorithm in such a way as to decrease the value of a "stress" function which measures the badness-of-fit between the configuration of points and the input data. This process continues typically for 20 to 50 iterations until a stopping criterion is reached, at which time the current coordinates of the objects represent the near-optimum spatial layout. The stopping criterion depends on how fast the stress has been decreasing from iteration to iteration, the size of the gradient, and a minimum stress value which is subject to user modification.

Accordingly, the MDS computer program constructs a configuration of points in the space from information about the "distances" between the points. In the instance of MDS, the "distances" are taken to be measures or metrics such as the frequency of contacts between objects, in such a way that the highest matrix score for any pair of objects represents a strong requirement that they be placed close together, and the lowest score indicates least importance in proximate locations. Other informational measures as indicated in the Tullis et al. article are used in standard MDS applications. The use of PDI in conjunction with an objective capture of behavioral use of an environment via photographic techniques in comparison to the conventional expert retrospective knowledge elicitation technique commonly used is a new unique and useful employment of standard MDS methodology for designing an immensely complex work station such as a submarine control room. It is common sense that the more relevant data and input to an objective methodology such as MDS provides more information about which to gain knowledge and thereby impact critical tasks such as the construction of an optimal facility layout. PDI used in MDS provides additional and often ignored critical data for facilities layout, namely, minimizing crew density (hence physical and mental stress) in busy and life threatening military control rooms, among other environments.

The output of two-dimensional multidimensional scaling is a computer tabulation of resultant x-y coordinates of each object and a printed plot of the area showing the machine recommended location of each object in the space under consideration.

This plot serves as a preliminary solution layout so that the analyst or layout planner then may, at his or her discretion, make a series of minor manual adjustments to the computer-generated solution. Such adjustments may be desirable to compensate for special needs such a repair access or for physical constraining features of the area such as the location of posts, stairways, and doorways, in the existing area. Accordingly, the multistage method provides for the exercise of work space-user judgments as well as consideration of work imposed conditions. Therefore, the present method is considered to be computer aided, rather than computer generated. This approach, in which the computer offers an initial solution followed by a manual adjustment, is also routinely utilized with success in the very similar problem of micro circuit chip layout on modern electronic printed circuit boards. Here too, an approximately optimum solution is developed automatically followed by vernier adjustments by technicians.

In MDS, typically a number of functional criteria are used as inputs which capture important inter-object relationships. The hereinabove incorporated by reference publication of Tullis et al lists five important facilities layout criteria which are employed: crew transition frequency, sequential activity dependencies, shared support equipment, visual/auditory interference potential and privacy requirements. To this list we add an important criterion: crew density (PDI), collected by time-lapse photography methods. The total number of object relationships is limited.

The input matrix of objects is then manipulated iteratively in the computerized algorithm until one pattern solution results. The final solution is that one which has a minimum "stress value" (i.e., the minimum badness-of-fit between the configuration of points and the input data).

Figure 9:
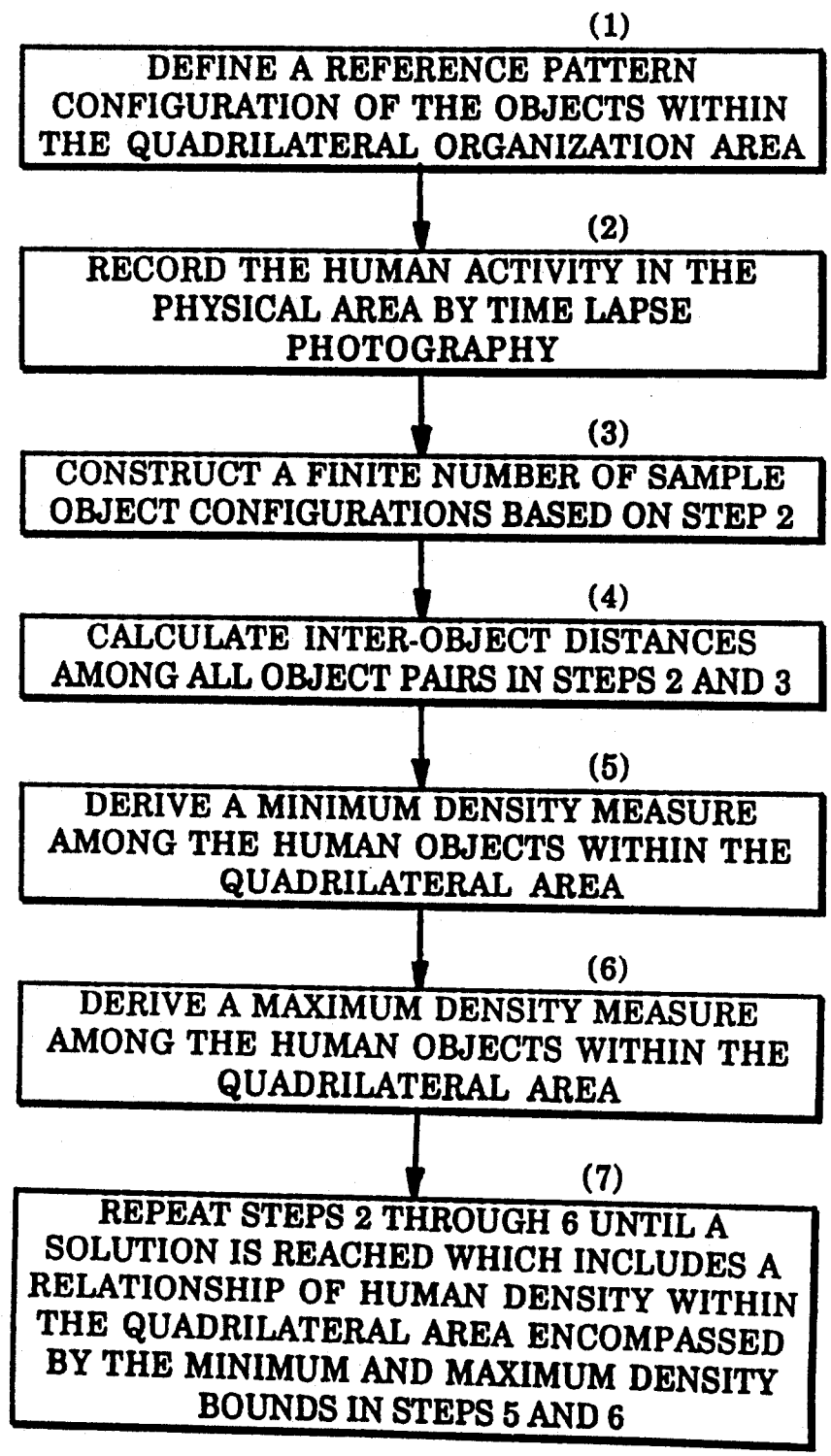
FIG. 9 is a flow chart which presents the process of spatially locating equipments in a submarine attack center.

Reference is made to FIG. 9 which is an overview of the process of spatially locating equipment in a submarine attack center. The process, summarized in FIG. 9, is sometimes called the multidimensional scaling (MDS) technique.

Flow step 1 provides background information to the facilities planner and serves to draw on paper the locations of the equipments and persons. Flow step 2 provides experimental information with a camera on how people actually move about in the workspace. Flow step 3 provides information on all the possible locations of the people and equipments. Flow step 4 provides all the inter-object distances of people and equipments. Flow step 5 provides information on the least congested locations of the people and equipments using the formula $PDI_{min}$. Flow step 6 provides information on the most congested locations of the people and equipments using the formula $PDI_{max}$. Flow step 7 compares all the possible experimental locations and the desired locations. If the locations are too congested or dispersed, flow steps 2 through 6 are repeated until the locations are neither too congested or dispersed.

In summary, the MDS methodology reveals the underlying structures in data sets and then presents them in a graphic format, i.e. a geometric configuration/mapping, suitable for visual analysis and interpretation. Application of PDI to MDS, therefore, assures optimal utilization of space by men and machines in limited space environments.

While preferred embodiments of the invention have been disclosed in detail, it should be understood by those skilled in the art that various other modifications may be made to the illustrated embodiments without departing from the scope of the invention as described in the specification and defined in the appended claims.

What is claimed is:

1. A method which aids in laying out spatial interrelationships among a plurality of objects including a predetermined number of items of equipment being operated upon by a predetermined number of people within a predetermined physical area, where said plurality of objects constitute a unitary functional organization, where said objects do not exceed 100 in number, and where functioning of said organization can be hindered by crowding, the method comprising the steps of:
   (a) defining an initial configuration of said objects within said predetermined physical area;
   (b) acting out a first scenario involving said objects within said predetermined physical area and recording movements of said predetermined number of people within said physical area performing at least one task, said recording step comprising photographing said movements of said predetermined number of people using time lapse photography;
   (c) introducing information about said recorded movements of said predetermined number of people and said initial configuration into a computer;
   (d) generating information on all possible locations of said predetermined number of people and said equipment in said predetermined physical area by constructing a finite number of experimental configurations of all said objects within said predetermined physical area with said computer;
   (e) determining a first relationship between (I) the relative positioning of the objects within the predetermined physical area and (II)(i) a first distance among all possible pairs of the objects, (II)(ii) the number of objects, and (II) (iii) a magnitude of the predetermined physical area for said first scenario using said information from said time lapse photography and for all of said finite number of experimental configurations constructed by said computer;
   (f) determining a minimum density measure among said predetermined number of people within said predetermined physical area;
   (g) determining a maximum density measure among said predetermined number of people within said predetermined physical area; and
   (h) selecting a set of relationships of said objects in said predetermined physical area wherein said first relationship for said selected set is at least equal to said minimum density measure and no more than said maximum density measure.

2. The method of claim 1 further comprising:
   (i) adjusting the number of objects within said predetermined physical area;
   (j) acting out a second scenario involving said adjusted number of objects and recording movements of people within said predetermined physical area using said time lapse photography; and
   (k) repeating steps (c) through (g) when said method with said first scenario does not yield a first relationship which falls between said minimum density measure and said maximum density measure.

3. A method as set forth in claim 1
   (l) wherein the relationship stated in step (e) varies (h) directly with the number of objects for a constant predetermined area; (ii) indirectly with the predetermined physical area for a constant number of objects; and (iii) indirectly with said distance among pairs for a constant number of objects and for a constant predetermined physical area.

4. A method as set forth in claim 1
   (m) wherein the relationships stated in step (e) are defined as follows:

$$PDI_{act} = \frac{1}{\bar{d}_{act}} \sqrt{\frac{n}{A}}$$

(n) where $\bar{d}_{act}$ is the average Euclidean distance among all possible pair of said objects, A is the predetermined physical area, and n is the number of the objects within the predetermined physical area.

5. The method of claim 1

(o) wherein the predetermined physical area represents an area within a submarine available for the location of a control center, said control center constituting a unitary functional organization for controlling at least one aspect of the submarine's operation;

(p) wherein said predetermined number of people are crew members for said submarine and said predetermined number of items of equipment are located in said control center, each of said crew members having functional assignments in said control center in association with the operation of said items of equipment; and (g) wherein said selecting step comprises selecting a set of relationships which yields a lay out for the control center having the items of equipment and the crew members positioned so that the crew members can carry out respective assigned functions in connection with said items of equipment with the least overall hinderance due to crowding within the control center.

* * * * *